(12) United States Patent
Lee et al.

(10) Patent No.: US 10,739,953 B2
(45) Date of Patent: Aug. 11, 2020

(54) APPARATUS AND METHOD FOR PROVIDING USER INTERFACE

(71) Applicant: SAMSUNG ELECTRONICS CO., LTD., Suwon-si (KR)

(72) Inventors: Kyoobin Lee, Suwon-si (KR); Ji In Baek, Suwon-si (KR); Hyun Surk Ryu, Suwon-si (KR); So Young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 434 days.

(21) Appl. No.: 15/312,045

(22) PCT Filed: Jun. 27, 2014

(86) PCT No.: PCT/KR2014/005734
§ 371 (c)(1),
(2) Date: Nov. 17, 2016

(87) PCT Pub. No.: WO2015/182811
PCT Pub. Date: Dec. 3, 2015

(65) Prior Publication Data
US 2017/0083197 A1    Mar. 23, 2017

(30) Foreign Application Priority Data
May 26, 2014    (KR) .................. 10-2014-0062869

(51) Int. Cl.
*G06F 3/0484* (2013.01)
*G06F 3/01* (2006.01)
(Continued)

(52) U.S. Cl.
CPC ............ *G06F 3/0484* (2013.01); *G06F 3/017* (2013.01); *G06F 3/0346* (2013.01);
(Continued)

(58) Field of Classification Search
CPC .... G06F 3/04883; G06F 3/017; G06F 3/0488; G06F 2203/04808; G06F 3/0482;
(Continued)

(56) References Cited

U.S. PATENT DOCUMENTS 6,266,059 B1 * 7/2001 Matthews, III ......... G06F 9/451
715/810
8,191,011 B2    5/2012 Abanami et al.
(Continued)

FOREIGN PATENT DOCUMENTS

JP    2013-073529 A    4/2013
KR    10-0931926 B1    12/2009
(Continued)

OTHER PUBLICATIONS

International Search Report (PCT/ISA/210) dated Feb. 10, 2015 issued by the International Searching Authority in counterpart International Application No. PCT/KR2014/005734.
(Continued)

*Primary Examiner* — Tuyetlien T Tran
(74) *Attorney, Agent, or Firm* — Sughrue Mion, PLLC

(57) ABSTRACT

An apparatus for providing a user interface provides a first user interface mode, and can switch to a second user interface mode if it receives a user command instructing to switch the mode to the second user interface mode which has a different user command input method from the first user interface mode. In the switching process, the apparatus is configured to reset a recognition pattern to distinguish a smaller number of user input types than the number of the user input types distinguishable in the first UI mode.

20 Claims, 14 Drawing Sheets

(51) Int. Cl.
*G06F 3/0346* (2013.01)
*G06F 3/0488* (2013.01)
*G06F 3/0481* (2013.01)
*G06F 3/16* (2006.01)
*G06F 3/0482* (2013.01)

(52) U.S. Cl.
CPC ........ *G06F 3/0488* (2013.01); *G06F 3/04817* (2013.01); *G06F 3/04842* (2013.01); *G06F 3/04883* (2013.01); *G06F 3/04886* (2013.01); *G06F 3/167* (2013.01); *G06F 3/0481* (2013.01); *G06F 3/0482* (2013.01); *G06F 2203/04808* (2013.01); *H04M 2250/22* (2013.01)

(58) Field of Classification Search
CPC .. G06F 3/04886; G06F 3/0485; G06F 3/0481; G06F 3/04842; G06F 3/0484; G06F 3/0346; G06F 3/04817; G06F 3/167; H04M 2250/22
See application file for complete search history.

(56) References Cited

U.S. PATENT DOCUMENTS

| | | | |
|---|---|---|---|
| 2010/0064261 A1 | 3/2010 | Andrews et al. | |
| 2012/0030569 A1 | 2/2012 | Migos et al. | |
| 2012/0050209 A1* | 3/2012 | King | G06F 3/0416 345/174 |
| 2012/0137253 A1* | 5/2012 | Eom | G06F 3/0481 715/835 |
| 2012/0192093 A1* | 7/2012 | Migos | G06F 3/04883 715/773 |
| 2012/0299849 A1* | 11/2012 | Homma | G06F 3/0488 345/173 |
| 2012/0299876 A1* | 11/2012 | De Leon | G06F 3/0425 345/175 |
| 2013/0053007 A1 | 2/2013 | Cosman et al. | |
| 2013/0176254 A1* | 7/2013 | Lee | G06F 3/041 345/173 |
| 2013/0181918 A1 | 7/2013 | Ting et al. | |
| 2013/0208135 A1* | 8/2013 | Han | G06F 3/017 348/211.9 |
| 2013/0212456 A1* | 8/2013 | Hyeon | G06F 17/2235 715/205 |
| 2013/0222338 A1* | 8/2013 | Gim | G06F 3/041 345/174 |
| 2013/0238724 A1* | 9/2013 | Cunningham | H04L 51/24 709/206 |
| 2013/0265261 A1* | 10/2013 | Min | G09G 5/006 345/173 |
| 2014/0055399 A1* | 2/2014 | Lee | G06F 3/03 345/173 |
| 2014/0281957 A1* | 9/2014 | Weng | G06F 1/1626 715/702 |
| 2014/0354553 A1* | 12/2014 | Dai | G06F 3/0416 345/173 |
| 2014/0354554 A1* | 12/2014 | Devi | G06F 3/0488 345/173 |
| 2014/0368421 A1* | 12/2014 | Smus | G06F 3/038 345/156 |
| 2015/0205358 A1* | 7/2015 | Lyren | G06F 3/0484 715/765 |

FOREIGN PATENT DOCUMENTS

| | | |
|---|---|---|
| KR | 10-2010-0136649 A | 12/2010 |
| KR | 10-2012-0058308 A | 6/2012 |
| KR | 10-2012-0117219 A | 10/2012 |
| KR | 10-2013-0078937 A | 7/2013 |
| KR | 10-2013-0081190 A | 7/2013 |
| KR | 10-2014-0027850 A | 3/2014 |
| WO | 2013/009062 A2 | 1/2013 |

OTHER PUBLICATIONS

Written Opinion (PCT/ISA/237) dated Feb. 10, 2015 issued by the International Searching Authority in counterpart International Application No. PCT/KR2014/005734.

\* cited by examiner

APPARATUS AND METHOD FOR PROVIDING USER INTERFACE

CROSS-REFERENCE TO RELATED APPLICATIONS

This application is a National Stage of International Application No. PCT/KR2014/005734 filed Jun. 27, 2014, which claims priority from Korean Patent Application No. 10-2014-0062869, filed May 26, 2014.

BACKGROUND

Field

Example embodiments relate to an apparatus and method for providing a user interface (UI), and more particularly, to an apparatus and method for switching between UI modes corresponding to different input devices.

Related Art

A user interface (UI) provides a transitory or continuous access to enable a user to communicate with an object, a system, a device, or a program. In general, an input into a UI providing apparatus requires an input device to obtain a user manipulation that moves a cursor or selects a predetermined target on a screen. Recently, a gesture recognized by an image sensor or a voice recognized by a voice recognition sensor may be used as the input.

A device that supports a gesture input recognizes a predetermined gesture of a user through the image sensor and enables a predetermined function to be performed based on the gesture. However, although the device that supports a gesture input uses a gesture as an input, the device operates in an application configured to operate only using a gesture, or utilizes an image sensor instead of a mouse or touch screen which are existing input devices, without changing a UI.

SUMMARY

According to example embodiments, there is provided an apparatus for providing a user interface (UI), the apparatus including a provider configured to provide a first UI mode, and a switch configured to switch to a second UI mode when a user command to instruct that a UI mode be switched to the second UI mode which employs a different user command input method from that of the first UI mode is received, wherein the switch may be configured to reset a recognition pattern to distinguish a number of user input types that is less than a number of user input types distinguished in the first UI mode.

The second UI mode may be configured to support a gesture input through at least one of an image sensor, a depth sensor, an event-based vision sensor, a proximity sensor, or an acceleration sensor.

The second UI mode may be configured to perform a command mapped based on an input pattern of the gesture input.

The switch may be configured to change at least one of a size, a position, or an arrangement of at least one icon provided in the first UI mode.

The user command may include at least one of a gesture input of a pre-designated pattern, a pre-designated voice input, or a pre-designated command input through a wireless device.

The switch may be configured to provide a visual feedback to a user when the UI mode is switched to the second UI mode.

The switch may be configured to switch to the first UI mode when an input supported by the first UI mode is received in the second UI mode.

According to example embodiments, there is also provided an apparatus for providing a UI, the apparatus including a provider configured to provide a first UI mode, and a switch configured to switch to a second UI mode when a first application registered in association with the second UI mode which employs a different user command input method than that of the first UI mode is executed, wherein the switch may be configured to reset a recognition pattern to distinguish a number of user input types that is less than a number of user input types distinguished in the first UI mode.

The second UI mode may be configured to support a gesture input through at least one of an image sensor, a depth sensor, an event-based vision sensor, a proximity sensor, or an acceleration sensor.

The switch may be configured to change at least one of a size, a position, or an arrangement of a menu of the first application provided in the first UI mode.

The first application may include at least one of a media player application, an image preview application, an image viewer application, a presentation application, a camera application, or a broadcast application.

The switch may be configured to switch to the first UI mode when a second application not supporting the second UI mode is executed in a foreground.

According to example embodiments, there is also provided an apparatus for providing a UI, the apparatus including a provider configured to provide a first UI mode to the apparatus when a user is at a distance less than a first threshold distance from the apparatus, and a switch configured to switch to a second UI mode which employs a different user command input method from that of the first UI mode when the user is a distance greater than or equal to the first threshold distance spaced apart from the apparatus, wherein the switch may be configured to reset a recognition pattern to distinguish a number of user input types that is less than a number of user input types distinguished in the first UI mode.

The second UI mode may be configured to support a gesture input through at least one of an image sensor, a depth sensor, an event-based vision sensor, a proximity sensor, or an acceleration sensor.

The switch may be configured to change at least one of a size, a position, or an arrangement of at least one icon provided in the first UI mode.

The switch may be configured to provide a visual feedback to the user when the UI mode is switched to the second UI mode.

According to example embodiments, there is also provided a method of providing a UI, the method including providing a first UI mode, and switching to a second UI mode when a user command to instruct that a UI mode be switched to the second UI mode which employs a different user command input method from that of the first UI mode is received, wherein the switching may include resetting a recognition pattern to distinguish a number of user input types that is less than a number of user input types distinguished in the first UI mode.

The second UI mode may be configured to support a gesture input through at least one of an image sensor, a depth sensor, an event-based vision sensor, a proximity sensor, or an acceleration sensor.

The switching may include changing at least one of a size, a position, or an arrangement of at least one icon provided in the first UI mode.

The user command may include at least one of a gesture input of a pre-designated pattern, a pre-designated voice input, or a pre-designated command input through a wireless device.

DETAILED DESCRIPTION

Figure 1:
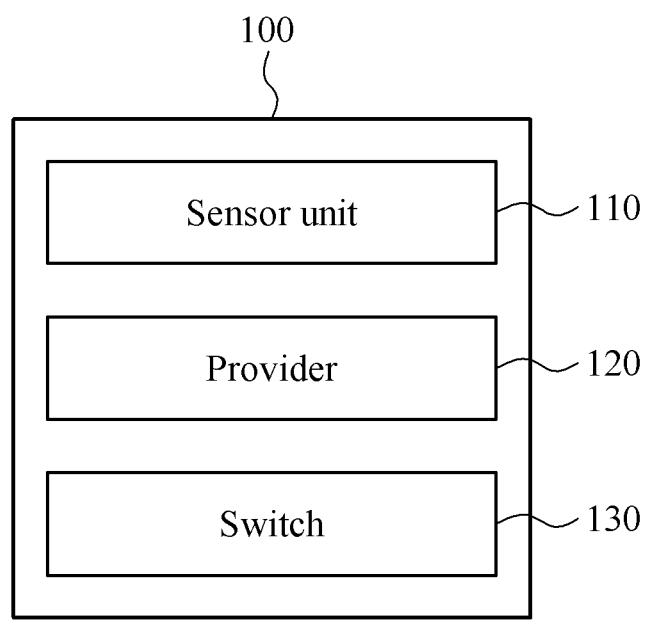
FIG. 1 is a block diagram illustrating a configuration of a user interface (UI) providing apparatus according to example embodiments.

Hereinafter, reference will now be made in detail to example embodiments with reference to the accompanying drawings, wherein like reference numerals refer to like elements throughout. However, the scope of the disclosure is not limited by those example embodiments.

The terms used herein are mainly selected from general terms currently being used in related art(s). However, other terms may be used depending on development and/or changes in technology, custom, or a preference of an operator. Thus, it should be understood that the terms used herein are terms merely used to describe the example embodiments, rather than terms intended to limit the spirit and scope of this disclosure.

FIG. 1 is a block diagram illustrating a configuration of a user interface (UI) providing apparatus according to example embodiments.

A UI providing apparatus 100 may include a sensor unit 110, a provider 120, and a switch 130.

The UI providing apparatus 100 may provide an external input device, and/or various input devices such as a touch screen for a touch input, a voice recognition sensor for a voice input, and at least one of an image sensor, a depth sensor, an event-based vision sensor, a proximity sensor, or an acceleration sensor for a gesture input. The image sensor may be an image recognition sensor. Further, all devices that may provide a UI for each input device may be included in the UI providing apparatus 100. For example, the UI providing apparatus 100 may include a mobile phone, a smart phone, a personal digital assistant (PDA), a portable multimedia player (PMP), a television (TV), a laptop computer, a tablet personal computer (PC), a digital broadcasting terminal, or a navigation system.

The sensor unit 110 may include at least one of the image sensor, the depth sensor, the event-based vision sensor, the proximity sensor, the acceleration sensor that are configured to sense a gesture input of a user, or the voice recognition sensor that is configured to sense a voice input of the user. However, example embodiments are not limited thereto. The sensor unit 110 may include all sensors configured to sense a gesture input or a voice input.

The UI providing apparatus 100 may provide a different UI mode based on each input device, and switch between UI modes. Thus, to provide a UI mode that supports a sensed gesture input or voice input and switch between UI modes, the sensor unit 110 may sense the gesture input or voice input of the user.

As described above, a different UI mode for each input device may be provided since a different number of user input types may be distinguished based on each input device.

For example, a number of user input types distinguished based on an input through the external input device such as a keyboard or a mouse, or a touch input through the touch screen may be greater than a number of user input types distinguished based on a gesture input through the image sensor.

Since a user input is provided as a user command through a separate input device, the UI providing apparatus 100 may subdivide and distinguish user inputs for each input device. Further, the UI providing apparatus 100 may subdivide and distinguish user commands through touch inputs sensed on a display screen provided by the UI providing apparatus 100.

On the contrary, an input range of the gesture input through the image sensor, the depth sensor, the event-based vision sensor, the proximity sensor, or the acceleration sensor may be based on a gesture of the user provided in a spatial range, rather than being limited to the input device or the touch screen provided by the UI providing apparatus 100. The UI providing apparatus 100 may sense and recognize the gesture input through the image sensor, the depth sensor, the event-based vision sensor, the proximity sensor, or the acceleration sensor.

Since the gesture input has a wide input range when compared to inputs through other input devices, the gesture input may distinguish and recognize a restricted number of user inputs when compared to user inputs through other input devices. Thus, a number of user input types distinguished through the gesture input may be less than a number of user input types distinguished through other input devices.

Accordingly, the UI providing apparatus 100 needs to provide a UI mode suitable for a characteristic of each input device. If only a single UI mode is provided with respect to all input devices, it may be difficult for the UI providing apparatus 100 to efficiently perform a command corresponding to a user input. When the UI providing apparatus 100 provides the same UI modes with respect to the gesture input and inputs through other input devices, the UI providing apparatus 100 may perform an operation unintended by the user, rather than an operation intended by the user. For example, although the user inputs a gesture with the intention of moving to a next icon, a gesture of moving to another icon which is not intended may be recognized in practice.

The provider 120 may provide a UI mode based on each input device. As described above, to efficiently perform a command corresponding to a user input, the UI providing apparatus 100 needs to provide a different UI mode for each input device.

For example, the UI mode may include a first UI mode that supports the input through the external input device or the input through the touch screen and a second UI mode that supports the gesture input through the image sensor, the depth sensor, the event-based vision sensor, the proximity sensor, or the acceleration sensor.

The provider 120 may classify the UI mode into the first UI mode or the second UI mode based on an input device. However, the UI mode is not limited to the two UI modes, and the provider 120 may additionally provide another UI mode based on an input device.

The switch 130 may switch to the second UI mode when a user command to instruct that the UI mode be switched to the second UI mode which supports an input device different from the input device supported by the first UI mode.

The second UI mode may provide a gesture input mode in which a gesture input may be sensed through the image sensor, the depth sensor, the event-based vision sensor, the proximity sensor, or the acceleration sensor. As described above, the gesture input may distinguish a number of user inputs which is less than a number of user inputs through the other input devices, and thus a separate UI mode may be provided.

In the second UI mode, a command mapped based on an input pattern of the gesture input sensed through the image sensor, the depth sensor, the event-based vision sensor, the proximity sensor, or the acceleration sensor may be performed. For example, a command to change a selected icon may be mapped to a gesture of waving a hand, a command to execute a selected icon may be mapped to a gesture of tapping a hand, and a command to rotate a selected image or photo in a clockwise or counterclockwise direction may be mapped to a gesture of rotating a hand in a clockwise or counterclockwise direction.

The switch 130 may set a separate user command to switch to the second UI mode. If the UI mode is switched based on all input patterns supported by the second UI mode in the first UI mode, switching between UI modes unintended by the user may be performed.

Thus, the user command may include at least one of a gesture input of a pre-designated pattern, a pre-designated voice input, or a pre-designated command input through a wireless device.

For example, the UI mode may be switched in response to the gesture of waving a hand or a preset voice input, or through an UI mode switch button of the wireless device.

The switch 130 may switch to the second UI mode when a first application registered in association with the second UI mode is executed. The first application may be an application of which all operations are performed even through the second UI mode that distinguishes a number of user inputs which is less than a number of user inputs distinguished by the first UI mode.

For example, the first application may include a media player application, an image preview application, an image viewer application, a presentation application, a camera application, and a broadcast application.

The above applications may operate in the same manner as in the first UI mode even through the gesture input of the user. Further, contents provided by the above applications may be images. Due to a characteristic of image contents, when the user is able to control the image contents through a simple gesture at a great distance, the user convenience may improve.

The switch 130 may calculate a distance between the UI providing apparatus 100 and the user, and switch the UI mode based on the calculated distance.

For example, when the user is at a distance less than a first threshold distance from the UI providing apparatus 100, the UI mode may be switched to the first UI mode. When the user is a distance greater than or equal to the first threshold distance spaced apart from the UI providing apparatus 100, the UI mode may be switched to the second UI mode.

Since the gesture input has a wide input range unlike inputs through the other input devices, the UI providing apparatus 100 may recognize the gesture input through the image sensor, the depth sensor, the event-based vision sensor, the proximity sensor, or the acceleration sensor although the user is spaced apart from the UI providing apparatus 100. Further, the user may control the UI providing apparatus 100 using a simple gesture at a great distance, and thus the user convenience may improve.

Based on the characteristic of the gesture input as described above, the first threshold distance which is a criterion for switching between UI modes may be set. In view of the user convenience, when the distance between the UI providing apparatus 100 and the user is greater than or equal to the first threshold distance, the UI mode may be switched to the second UI mode without a separate command. When the distance between the UI providing apparatus 100 and the user is less than the first threshold distance, the UI mode may be switched to the first UI mode.

As described above, the switch 130 may switch from the first UI mode to the second UI mode based on a user command, a type of an application being executed, or a distance from the user.

The switch 130 may reset a recognition pattern with respect to the input device supported by the second UI mode, in the process of switching to the second UI mode which employs a different user command input method from that of the first UI mode. For example, when the second UI mode supports a gesture input, the switch 130 may reset the recognition pattern to recognize the gesture input.

The switch 130 may change at least one of a size, a position, or an arrangement of at least one icon provided in the first UI mode, so as to correspond to an input range of the gesture input. A number of input types distinguished in the second UI mode may be less than a number of input types distinguished in the first UI mode, and thus the at least one icon may be rearranged to be optimized to the second UI mode.

For example, when the second UI mode supports a gesture input, the gesture input may have a wide input range to recognize an input and recognize a restricted number of inputs, unlike an input through the mouse or keyboard or a touch input. Thus, by changing at least one of the size, the position, or the arrangement of the at least one icon, an icon may be efficiently selected and moved through the gesture input in the second UI mode.

Further, the switch 130 may reset the recognition pattern when switching to the second UI mode in response to the first application registered in association with the second UI mode being executed, and change at least one of a size, a position, or an arrangement of a menu of the first application.

At least one of the size, the position, or the arrangement of the menu may be changed such that the menu provided in the first application may be efficiently moved and selected in the second UI mode that supports the gesture input.

When the UI mode is switched to the second UI mode, the switch 130 may provide a visual feedback to inform the user of entry to the second UI.

For example, when the UI mode is switched to the second UI mode, the user may verify whether the UI providing apparatus 100 recognizes that the UI mode is switched, through a predetermined color represented at a center of the screen or a predetermined color represented at an edge of the screen.

When an input through another input device not supported by the second UI mode is recognized, the switch 130 may switch to a UI mode that supports the recognized input.

For example, when an input through the mouse or keyboard or a touch input supported by the first UI mode is recognized, the switch 130 may switch to the first UI mode without performing a separate procedure. Through this, switching between UI modes may be provided based on an input device.

Further, when an application not supporting the second UI mode is executed in a foreground in the second UI mode, the UI mode may be re-switched to the first UI mode, whereby switching between UI modes may be provided based on an input device.

Figure 2:
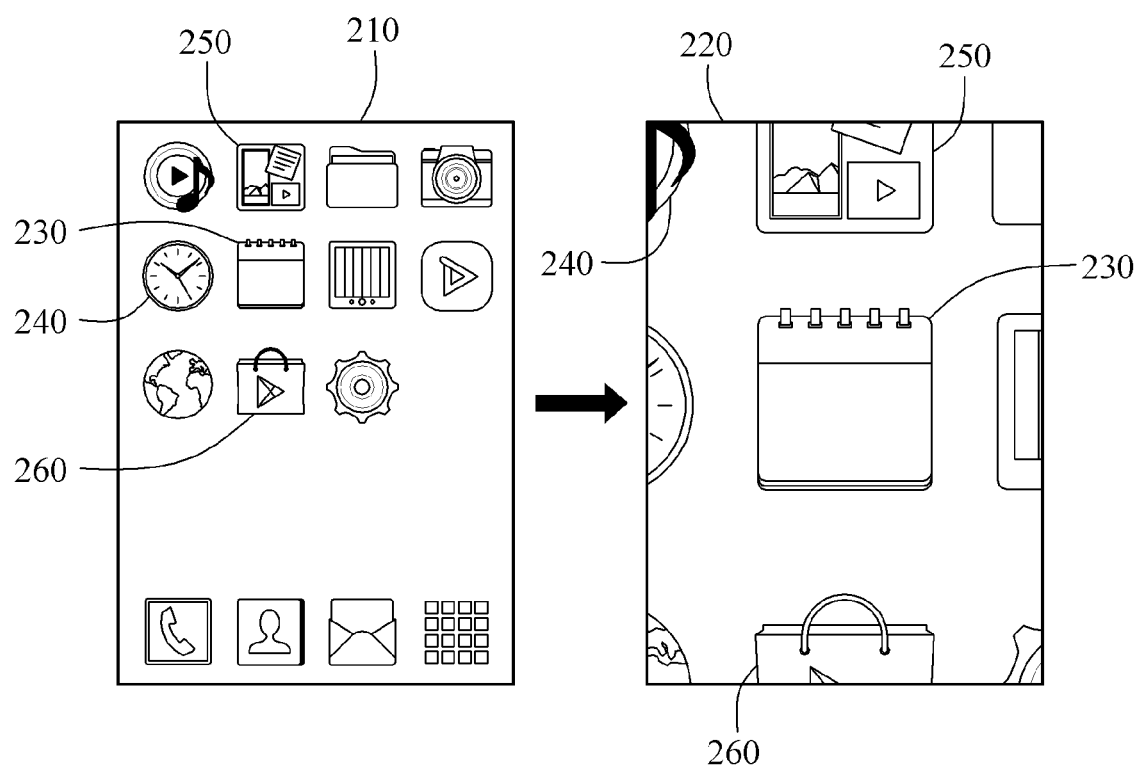
FIG. 2 illustrates a second UI mode in which sizes of icons are changed according to example embodiments.

FIG. 2 illustrates a second UI mode in which sizes of icons is changed according to example embodiments.

A screen in which sizes of icons are changed in response to switching from a first UI mode 210 to a second UI mode 220 is illustrated.

The first UI mode 210 may support an input through a mouse or keyboard or a touch input. User input types of the inputs may be subdivided and distinguished. Thus, although multiple icons are displayed on the single screen, a command intended by a user may be performed.

On the contrary, a gesture input may distinguish a number of user input types which is less than a number of user input types distinguished by the input devices, and have an input range or radius for recognition. Thus, when an icon is selected or moved through the gesture input in the first UI mode, there may be a restriction, for example, a command unintended by the user may be performed.

Thus, in the second UI mode supporting the gesture input, the sizes of the icons may be changed. For example, with respect to an icon 230, the size of the icon 230 displayed in the second UI mode 220 may be greater than the size of the icon 230 displayed in the first UI mode 210. Similarly, icons 240, 250, 260, and 270 may also be enlarged by the same ratio.

Although not shown in the drawing, positions and an arrangement of the icons 230, 240, 250, 260, and 270 may also be changed. As described above, the gesture input may not distinguish user inputs precisely when compared to other input devices, when selecting or moving an icon. Thus, positions and an arrangement of frequently used icons may be changed such that the user may conveniently select one.

For example, recommended contents unrelated to an application or category may be arranged on the left and right sides of a line displaying icons. The recommended contents may include a profile of the user, or information verified by a sensor, for example, time or a location. Further, the recommended contents may be set based on content use frequency history of the user.

The positions and the arrangement of the icons of the application may be changed based on an attribute of the application. Videos, music, photos, books, and maps may be distinguished based on attributes of contents in the application.

Figure 3:
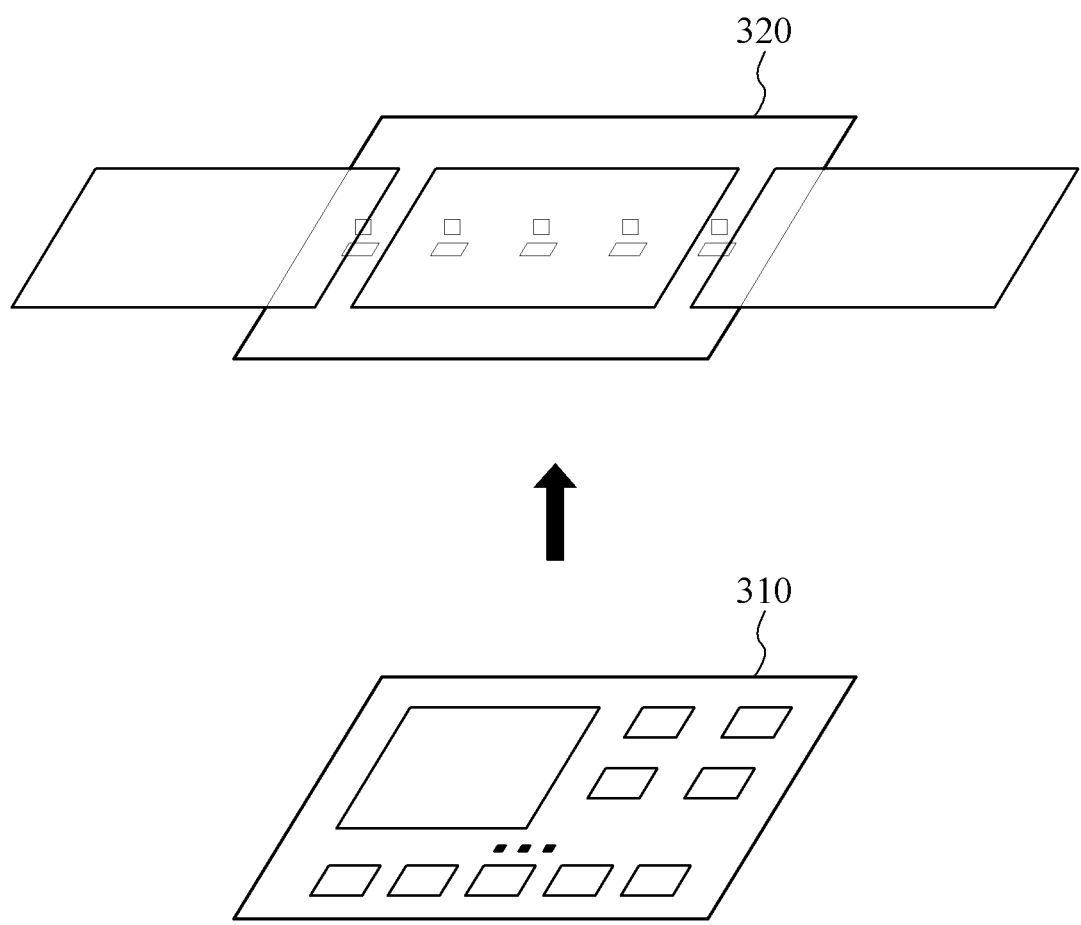
FIG. 3 illustrates a second UI mode in which positions and an arrangement of icons are changed according to example embodiments.

FIG. 3 suggests a configuration in which icons are arranged in rows and columns. However, example embodiments are not limited thereto. The icons may be placed in an arrangement desired by the user through user settings.

To change positions and an arrangement of icons to be optimized to a gesture input, a ratio of a moment value Q defined by icon arrangement may be set to be included within a predetermined range or to have an optimal value. The moment value Q may be expressed by Equation 1.

$$Q = \frac{\sum_i w_i \cdot x_i^2}{\sum_i w_i \cdot y_i^2} \quad \text{[Equation 1]}$$

In Equation 1, i denotes an index of each icon, x and y denote a position of each icon, and w denotes a use frequency of each icon. In this example, each icon may be arranged such that Q may correspond to the optimal value or be included in the predetermined range. The optimal value and the predetermined range may be selected by the user. As necessary, a portion of icons provided in the first UI mode may not be displayed in the second UI mode.

By changing at least one of the size, the position, or the arrangement of the icons in the process of switching from the first UI mode to the second UI mode, the second UI mode optimized to the gesture input may be provided. Further, similar to inputs through other input devices, a command intended by the user may be performed efficiently through the gesture input.

FIG. 3 illustrates a second UI mode in which positions and an arrangement of icons are changed according to example embodiments.

Referring to FIG. 3, a screen in which positions and an arrangement of icons of a first UI mode are changed in a second UI mode is illustrated.

A home screen 310 of the first UI mode may be displayed. When a user command to instruct that a UI mode be switched to the second UI mode is received, the home screen 310 may be switched to a home screen 320 of the second UI mode.

Further, in the home screen 320 of the second UI mode, at least one of sizes, the positions, or the arrangement of the icons provided in the first UI mode may be changed.

Through this, a user may move between icons or select an icon through a simple gesture input.

Although not shown in the drawing, while an application providing contents such as a media player is being executed in the first UI mode, the user command to instruct that the UI mode be switched to the second UI mode may be received. In this example, the UI mode may be switched to the second UI mode and at least one of a size, a position, or an arrangement of a screen to display the contents provided by the application may be changed.

Through this, the user may move between contents or select content through a gesture input.

Figure 4:
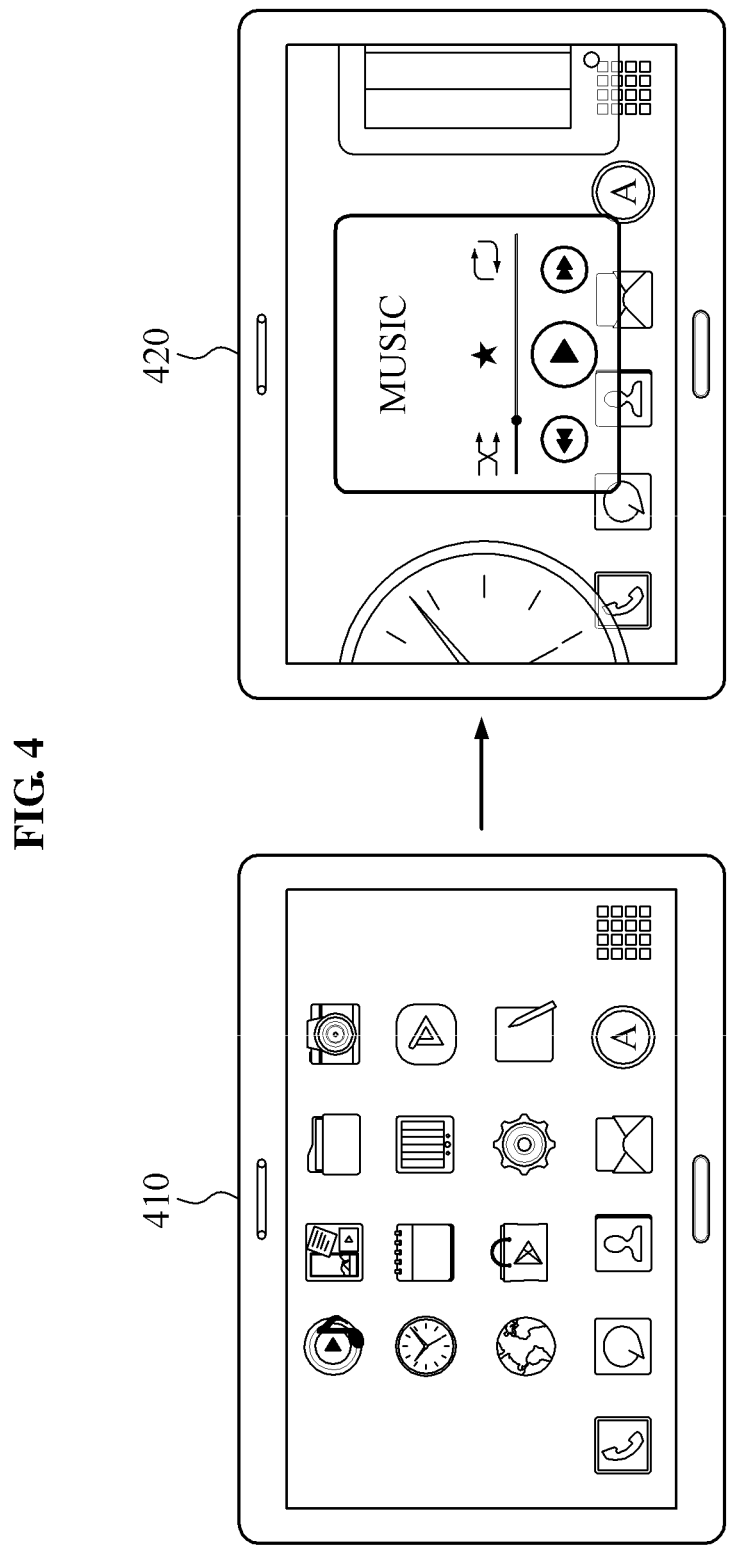
FIG. 4 illustrates a pre-selected mode with respect to an icon or content according to example embodiments.

FIG. 4 illustrates a pre-selected mode with respect to an icon or content according to example embodiments.

Icons or contents of an application selectable through a gesture input may be displayed on a single screen 410. When a predetermined gesture of a user is input, the screen 410 may be changed to a pre-selected mode screen 420 of a selected application or content.

A pre-selected mode is a stage immediately before an application or content is executed, and may provide contents of a selected application or content in advance of executing the application.

In the pre-selected mode, a position and a size to display the contents of the selected application or content may be changed to be optimized within a range of the gesture input.

Further, unselected other applications or contents may be arranged on the left and right sides of the selected application or content, and at least a portion of the other applications or contents may be provided on the screen in advance.

To view contents of a target other than the selected application or content in advance, the user may select another application or content arranged on the left and right sides by inputting a predetermined gesture input such as a gesture of waving a hand.

Figure 5:
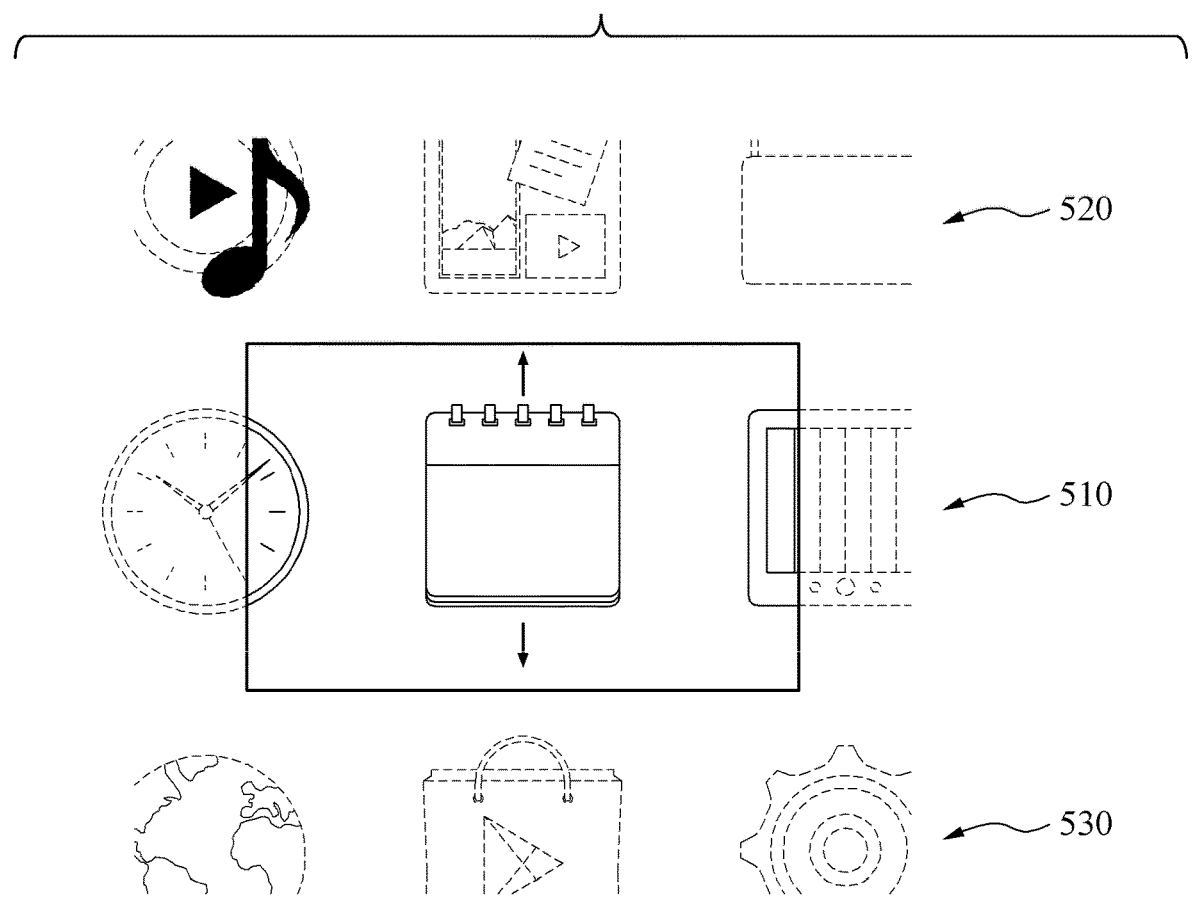
FIG. 5 illustrates a second UI mode in which positions and an arrangement of icons are changed based on a preset criterion according to example embodiments.

FIG. 5 illustrates a second UI mode in which positions and an arrangement of icons are changed based on a preset criterion according to example embodiments.

In a second UI mode that supports a gesture input, positions and an arrangement of icons may be changed based on a preset criterion. As described with reference to FIG. 2, the gesture input may distinguish a number of user input types which is less than a number of user input types distinguished by other input devices. Due to the restricted number of user input types, sizes of the icons may be changed in the second UI mode.

For example, recommended contents may be disposed on a first row 510 of a portion displayed on a screen after switching to the second UI mode. The recommended contents may be contents recommended based on current states of the user (a user profile, or information verified through a variety of sensors, for example, time or a location) and past content consume propensity (video, TV, music, book, favorite site, site visit frequency, and application use frequency).

Further, a position at which each recommended content is to be disposed may be determined based on the past content consume propensity. For example, content with a relatively great past consume propensity may be disposed at a position at which the content may be relatively easily selected by the user. In detail, recommended content that is most frequently used based on use history may be set to be disposed at a central portion of the first row 510. Through this, the user may easily select a frequently used application or content.

On a second row 520 disposed above the first row 510, applications classified by each category may be disposed. For example, applications having the same or similar attributes may be disposed on the second row 520. Here, an attribute may be related to an operation of an application. Each of at least one application may be assigned with a predetermined attribute, and each attribute may be classified by each category. Thus, by classifying applications by the same or similar category, related applications may be provided to the user conveniently.

On a third row 530 disposed below the first row 510, recently used applications may be disposed. By classifying the applications recently used by the user and disposing the applications on the third row 530, the user convenience may improve.

Through re-arrangement of icons when switching to the second UI mode, the user may efficiently select an icon to be executed without frequently changing a selected icon. However, the change in the arrangement of the icons is not limited thereto. When switching to the second UI mode, the arrangement may be changed as desired by the user based on user settings.

Figure 6:
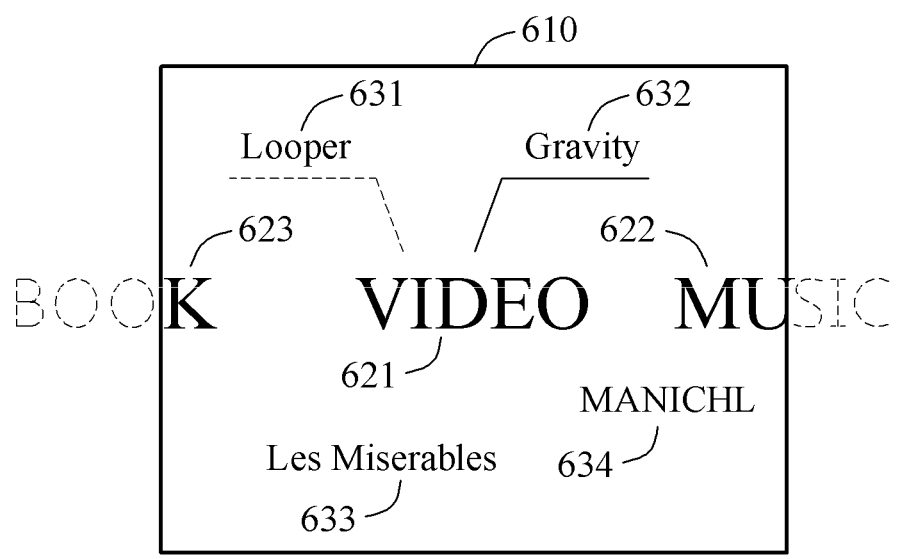
FIG. 6 illustrates a second UI mode in which categories are classified based on an attribute of an application or content according to example embodiments.

FIG. 6 illustrates a second UI mode in which categories are classified based on an attribute of an application or content according to example embodiments.

In a second UI mode that supports a gesture input, categories classified based on an attribute of an application or content may be provided. The categories may be classified based on the attribute of the application or content. For example, the categories may be classified based on the attribute such as a video, music, a photo, an article, an SNS, a book, a map, or a game. However, the attribute which is a criterion for classifying the categories is not limited thereto. The attribute may be changed based on user settings.

The categories may be provided in the second UI mode 610. Before a user selects a category, the user may view contents 631, 632, 633, and 634 included in the category in advance, immediately select one from the contents 631, 632, 633, and 634, and execute the selected one.

One of the contents 631, 632, 633, and 634 may be selected immediately through a predetermined gesture pattern (for example, a gesture pattern of lifting a hand and hovering). Further, a number of contents to be displayed in relation with the corresponding category may be determined based on a resolution at which an image sensor, a depth sensor, an event-based vision sensor, or an acceleration sensor configured to recognize a gesture input may distinguish the gesture input, as expressed by Equation 2.

$$Q = \frac{q}{R} \quad \text{[Equation 2]}$$

In Equation 2, Q denotes a number of contents that may be immediately selected, R denotes a resolution (unit of distance) of each sensor, and q denotes a predetermined constant. Through Equation 2, the number of contents included in the corresponding category may be determined.

In an example, categories 621, 622, and 623 may be disposed in a row, and the user may switch between categories through a predetermined gesture pattern such as a gesture of waving a hand.

For example, in a case in which the VIDEO category 621 is currently being selected, the user may switch to the MUSIC category 622 through a gesture of waving a hand to the right, and switch to the BOOK category 623 through a gesture of waving a hand to the left. However, example embodiments are not limited thereto. The user may switch between categories through another gesture pattern based on the arrangement of the categories.

Figure 7:
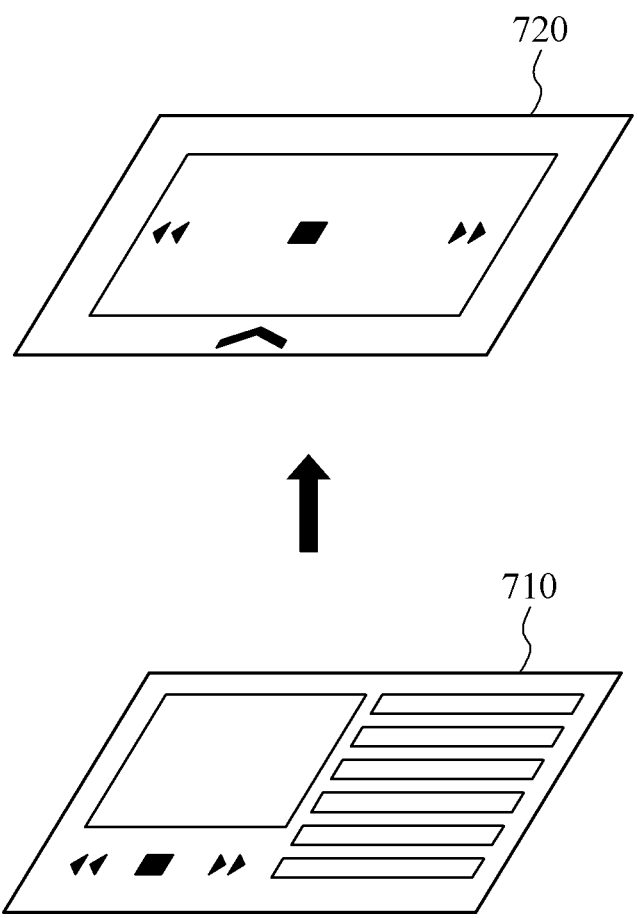
FIG. 7 illustrates a second UI mode in which a size, a position, and an arrangement of a menu of an application are changed according to example embodiments.

FIG. 7 illustrates a second UI mode in which a size, a position, and an arrangement of a menu of an application are changed according to example embodiments.

In FIG. 7, a screen on which at least one of a size, a position, or an arrangement of a menu provided in an application is changed when a UI mode is switched from a first UI mode 710 to a second UI mode 720 is illustrated.

In the second UI mode 720, the size of the menu may be increased to be suitable for a gesture input, and the position of the menu may be changed as well. Further, although not shown in the drawing, a position and an arrangement of a playlist provided in the application may be changed to be easily selected through a gesture.

For example, the application may include at least one of a media player application, an image preview application, an image viewer application, a presentation application, a camera application, or a broadcast application. In the second UI mode 720, the size of the menu of the application may be increased to be suitable for a gesture input, and the position of the menu may be changed, whereby a user may operate the application conveniently. Further, content included in an image list, a music and video playlist, a presentation list, or a broadcast list provided in the application may be easily selected through a gesture input.

As described above, the user may efficiently manipulate the menu or content included in the playlist provided in the application through a gesture input as intended.

Figure 8:
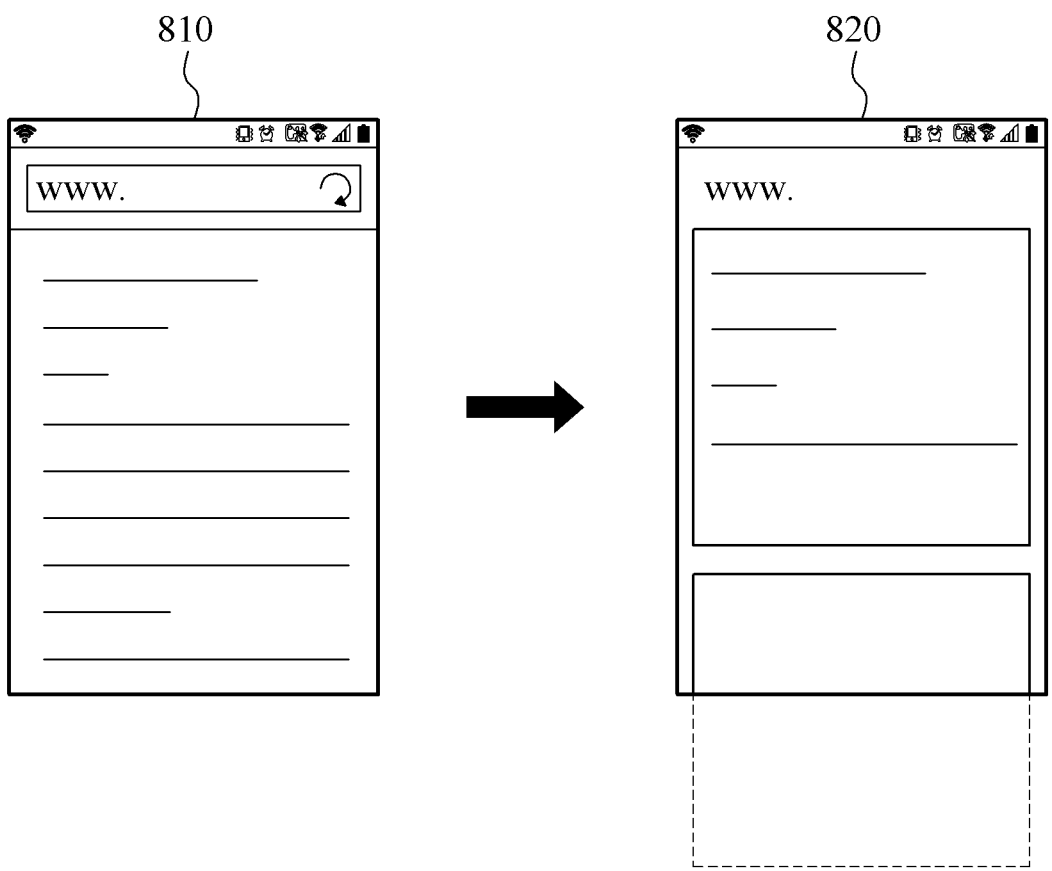
FIG. 8 illustrates a second UI mode in which a screen configuration of content is changed according to example embodiments.

FIG. 8 illustrates a second UI mode in which a screen configuration of content is changed according to example embodiments.

In a first UI mode 810 in which contents displayed on a screen are listed lengthwise, a user may move to a desired page by controlling a scroll bar.

Since a second UI mode 820 supports a gesture input, an input method such as the scroll bar may be inconvenient to the user. In this example, the screen configuration may be changed to be suitable for an input pattern of the gesture input.

For example, in a case in which the contents are listed lengthwise, the contents may be divided to be displayed on a single page. The user may import a remaining content page not displayed on the screen through a predetermined gesture such as flip-up.

In this process, image content such as a photo or picture may be displayed as a single unit to be separated from a text. Through this, the image content such as a photo or picture may be prevented from being divided in the middle.

Figure 9:
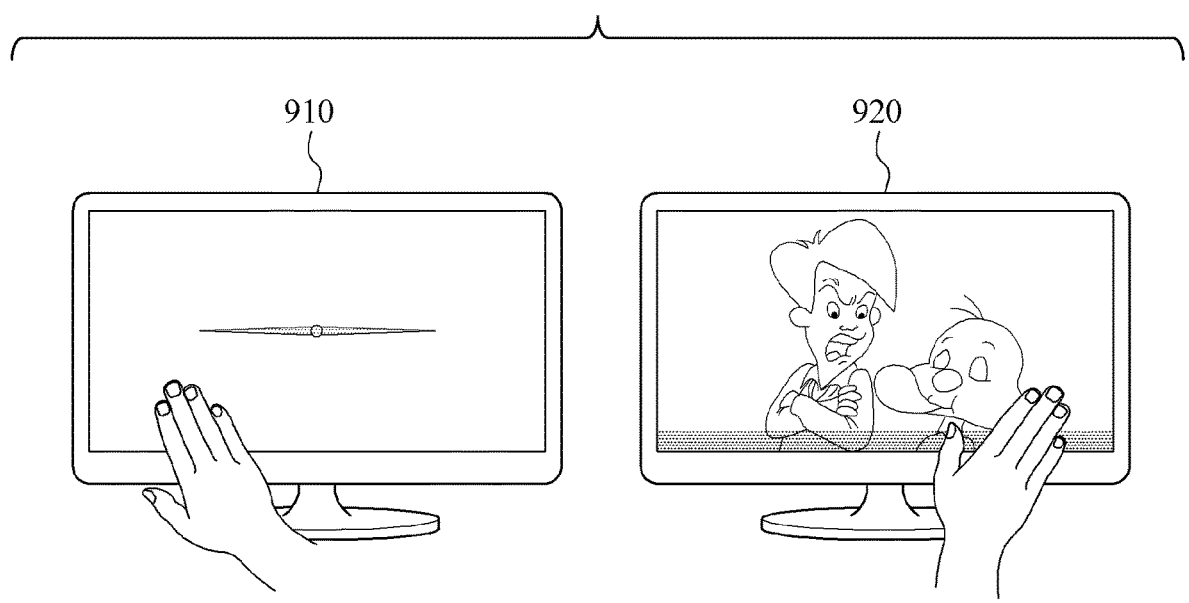
FIG. 9 illustrates a visual feedback provided when switching to a second UI mode according to example embodiments.

FIG. 9 illustrates a visual feedback provided when switching to a second UI mode according to example embodiments.

When switching from a first UI mode to a second UI mode, a predetermined visual feedback may be provided to a user through a screen. Through the visual feedback, the user may verify whether a system of the UI providing apparatus 100 performed switching to the second UI mode.

In a case in which content is not displayed as shown in a screen 910, the visual feedback may be provided by representing a predetermined color at a center of the screen 910. In a case in which content is displayed as shown in a screen 920, the visual feedback may be provided by representing a predetermined color at an edge of the screen 920.

However, example embodiments are not limited thereto. The visual feedback may be provided based on user settings through a wavy screen, a change in transparency of a screen, screen size reduction, a twisted screen, or a fragmented screen to be recognized by the user.

Through this, the user may verify that the UI mode is switched to the second UI mode, and control the UI providing apparatus 100 through a gesture input which is an input scheme supported by the second UI mode.

Figure 10:
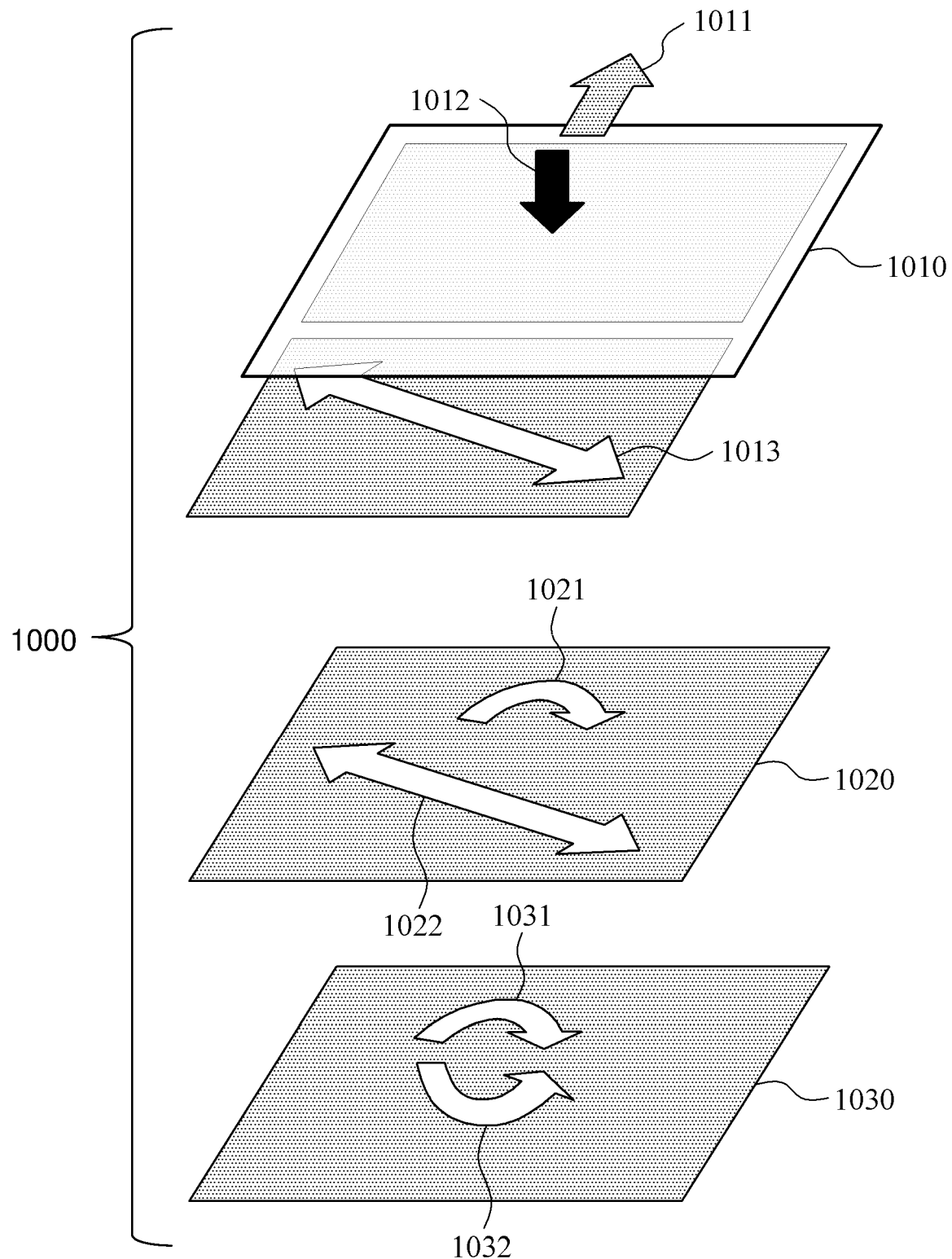
FIG. 10 illustrates gesture input patterns mapped to different commands based on an application being executed in a second UI mode according to example embodiments.

FIG. 10 illustrates gesture input patterns 1000 mapped to different commands based on an application being executed in a second UI mode according to example embodiments.

Each command may be mapped to a gesture input based on an input pattern. For example, a gesture input pattern 1011 of moving up and down on a screen 1010 displaying contents may be mapped to a scroll command to move up and down between the contents displayed on the screen. In response to the gesture input pattern 1011 of moving up and down, the contents displayed on the screen may be moved up and down.

A gesture input pattern 1012 of tapping may be mapped to a command to select current content. A user may zoom in a picture or image or play content through the gesture input pattern 1012 of tapping the content. Further, an input pattern 1013 of opening or closing a hand may be mapped to a command to zoom in or out current content. Through the input pattern 1013 of opening or closing a hand, the user may zoom in or out the content currently being displayed on the screen.

Gesture input patterns may be mapped to different commands based on a type of an application executed in the second UI mode.

For example, in an image viewer application 1020 such as a photo viewer, an input pattern 1021 of rotating a cupped hand in a clockwise or counterclockwise direction may be mapped to a command to rotate a displayed image in a clockwise or counterclockwise direction. Further, an input pattern 1022 of opening or closing a hand may be mapped to a command to zoom in or out the content.

In a media player application 1030, an input pattern 1031 of rotating a cupped hand in a clockwise direction and an input pattern 1032 of rotating a cupped hand in a counterclockwise direction may be mapped to a command to control a volume of a media player.

Examples of commands mapped to gesture input patterns are provided above. However, example embodiments are not limited thereto. The gesture input patterns may be mapped to various intuitive commands to be performed with respect to the gesture inputs.

Figure 11:
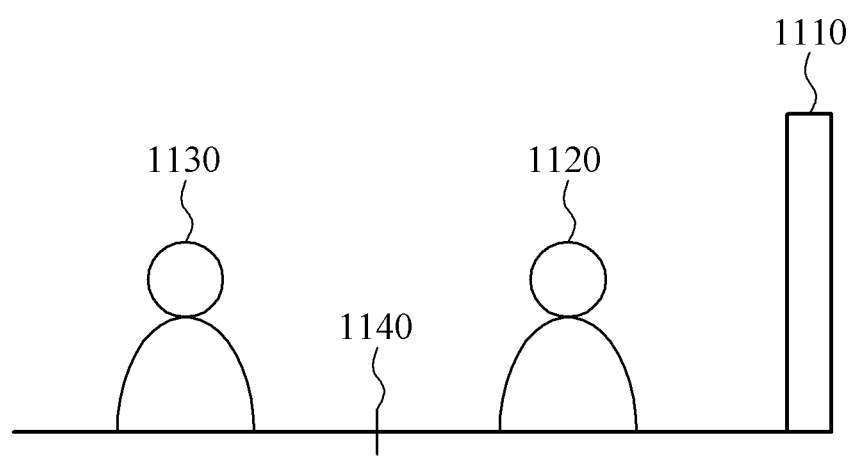
FIG. 11 illustrates a change in a distance between a UI providing apparatus and a user according to example embodiments.

FIG. 11 illustrates a change in a distance between a UI providing apparatus and a user according to example embodiments.

A gesture input may be easy to control a UI providing apparatus 1110 at a great distance when compared to other input devices. Thus, switching between UI modes may be performed by determining a distance between the UI providing apparatus 1110 and a user.

When a distance between the UI providing apparatus 1110 and a user 1120 is less than a first threshold distance 1140, a first UI mode may be provided. It may be easier to control the UI providing apparatus 1110 through an input device other than a gesture input at a short distance.

When a distance between the UI providing apparatus 1110 and a user 1130 is greater than or equal to the first threshold distance 1140, the UI mode may be switched to a second UI mode. As described above, it may be easier for the user 1130 to control the UI providing apparatus 1110 through a gesture input at a great distance.

Figure 12:
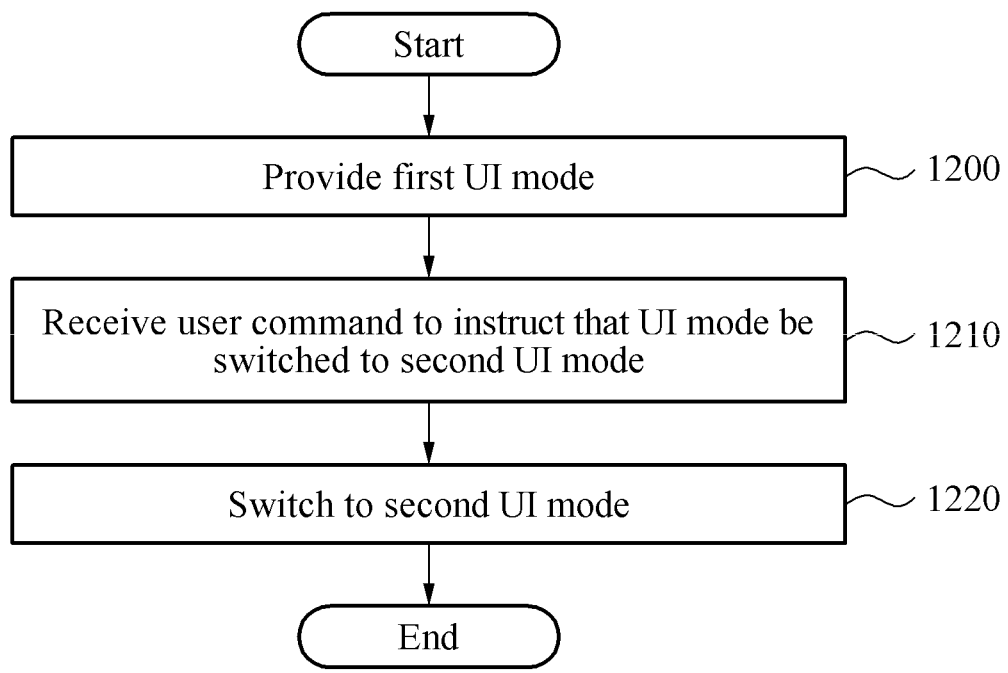
FIG. 12 is a flowchart illustrating a method of switching to a second UI mode based on a user command according to example embodiments.

FIG. 12 is a flowchart illustrating a method of switching to a second UI mode based on a user command according to example embodiments.

In operation 1200, a UI providing apparatus may provide a first UI mode. The first UI mode may support an input through an input device such as a keyboard or mouse, and a touch input through a touch display.

In operation 1210, the UI providing apparatus may receive a user command to instruct that a UI mode be switched to a second UI mode which employs a different user command input method from that of the first UI mode. The user command may include at least one of a gesture input of a pre-designated pattern, a pre-designated voice input, or a pre-designated command input through a wireless device.

In operation 1220, the UI providing apparatus may switch to the second UI mode based on the received user command. The second UI mode may support a gesture input through an image sensor.

The UI mode may be switched to the second UI mode, and a recognition pattern may be reset to distinguish a number of user input types that is less than a number of user input types distinguished in the first UI mode.

Further, sizes, positions, and an arrangement of icons may be changed based on a gesture input pattern supported by the second UI mode.

Figure 13:
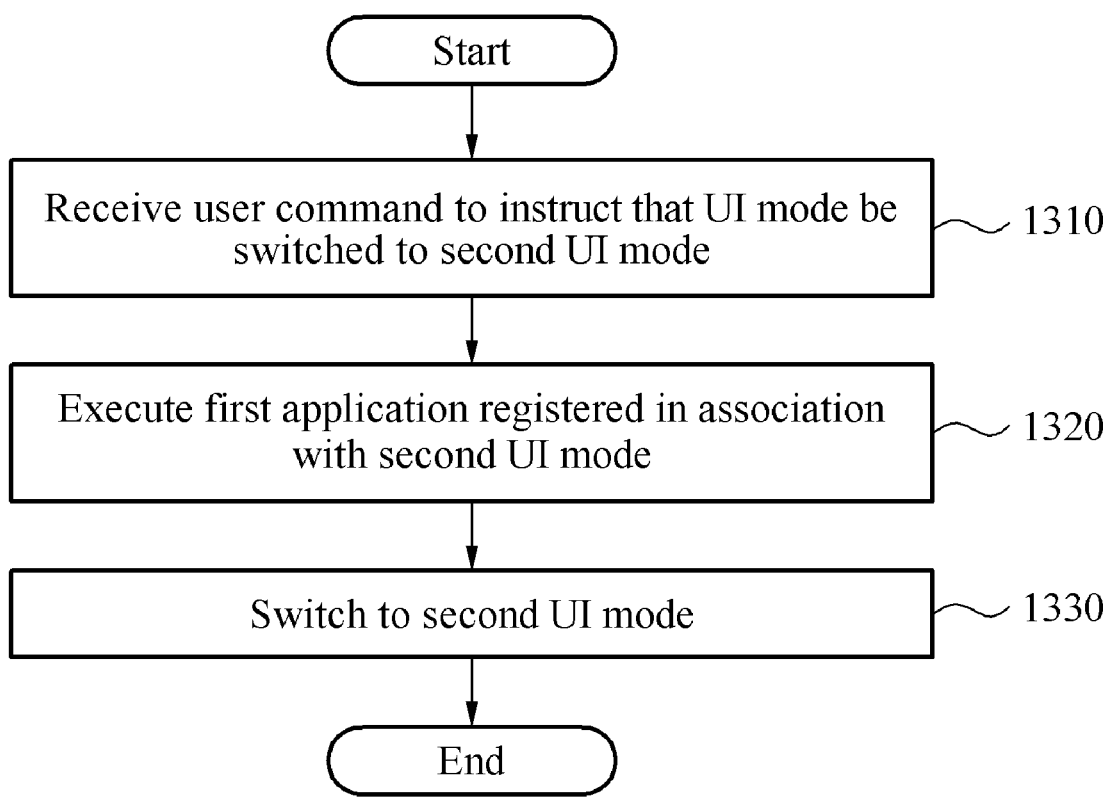
FIG. 13 is a flowchart illustrating a method of switching to a second UI mode based on an application being executed according to example embodiments.

FIG. 13 is a flowchart illustrating a method of switching to a second UI mode based on an application being executed according to example embodiments.

In operation 1310, a UI providing apparatus may receive a user command to instruct that a UI mode be switched to a second UI mode which employs a different user command input method from that of a first UI mode. The user command may include at least one of a gesture input of a pre-designated pattern, a pre-designated voice input, or a pre-designated command input through a wireless device.

In operation 1320, the UI providing apparatus may execute a first application registered in association with the second UI mode. The first application may support a gesture input method. The UI providing apparatus may be set to switch from the first UI mode to the second UI mode when the first application is executed.

In operation 1330, the UI providing apparatus may switch to the second UI mode in response to the execution of the first application. The UI mode may be switched to the second UI mode, and a recognition pattern may be reset to distinguish a number of user input types that is less than a number of user input types distinguished in the first UI mode.

Further, a size, a position, and an arrangement of a menu provided by the first application may be changed based on a gesture input pattern supported by the second UI mode.

Figure 14:
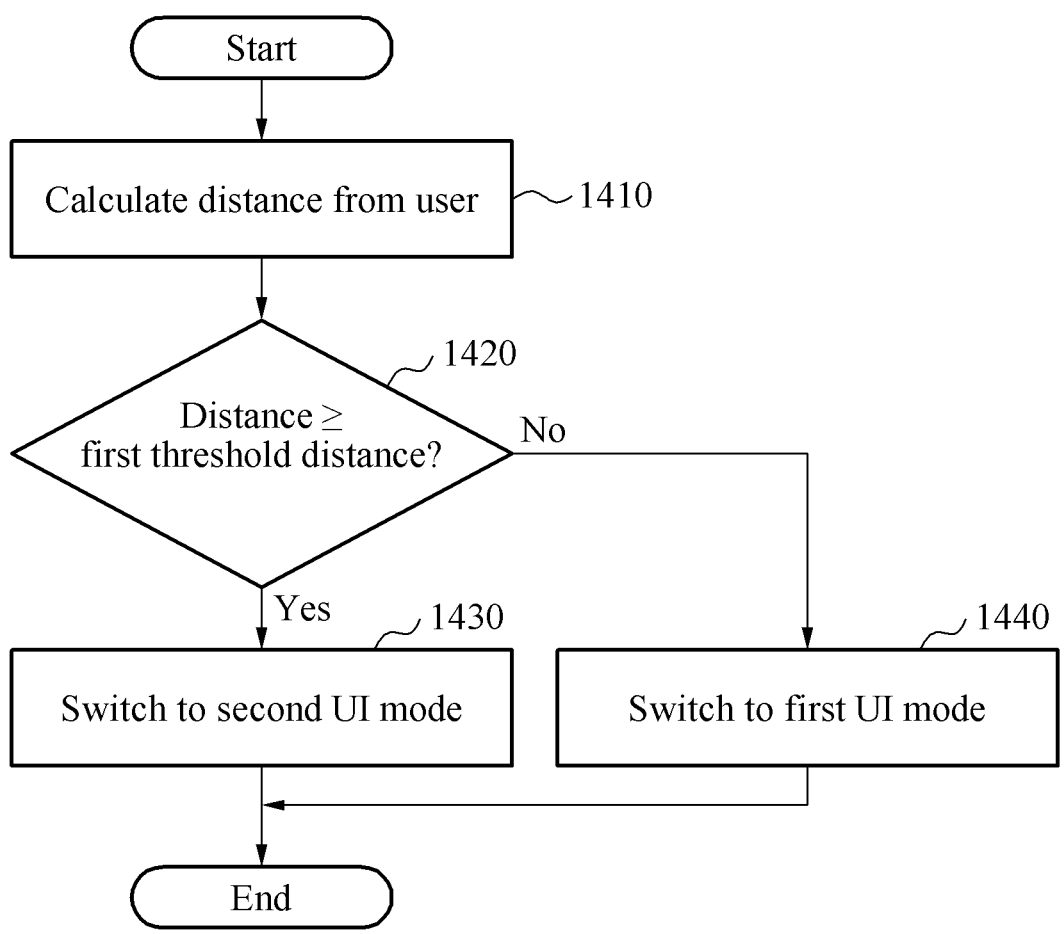
FIG. 14 is a flowchart illustrating a method of switching a UI mode based on a position of a user according to example embodiments.

FIG. 14 is a flowchart illustrating a method of switching a UI mode based on a position of a user according to example embodiments.

In operation 1410, a UI providing apparatus may calculate a distance from a user. A gesture input may be easy to control the UI providing apparatus at a great distance when compared to other input devices. Thus, the UI providing apparatus may switch between UI modes by determining the distance from the user.

In operation 1420, the UI providing apparatus may determine whether the calculated distance is greater than or equal to a first threshold distance which is a criterion for switching between UI modes. The first threshold distance may be adjusted by a user through settings.

In operation 1430, the UI providing apparatus may switch to a second UI mode that supports a gesture input when the calculated distance is greater than or equal to the first threshold distance. In operation 1440, the UI providing apparatus may switch to a first UI mode that supports an input other than the gesture input when the calculated distance is less than the first threshold distance.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for providing a user interface (UI), the apparatus comprising:
a sensor configured to sense a gesture of a user, and
a processor comprising:
a provider configured to provide a first UI mode configured to receive a user input as at least one from among a mouse input received through a mouse and a touch input received through a touch screen; and
a switch configured to switch an operation of the touch screen from the first UI mode to a second UI mode based on receiving a user command to switch to the second UI mode configured to receive the user input as the gesture of the user that is sensed by the sensor through a spatial distance,
wherein, based on the receiving the user command, the switch is further configured to reset a first recognition pattern of the first UI mode to a second recognition pattern of the second UI mode, the second recognition pattern configured to distinguish a smaller number of user input types recognizable through the gesture in the second UI mode, than the number of the user input types distinguishable through the at least one from among the mouse input and the touch input in the first UI mode,
wherein the switch is further configured to, while the touch screen is in the second UI mode, switch from the second UI mode to the first UI mode based on the user input supported by the first UI mode received in the second UI mode, and
wherein a type of the user input receivable in the first UI mode and a type of the user input receivable in the second UT mode are mutually exclusive.

2. The apparatus of claim 1, wherein the sensor comprises at least one from among an image sensor, a depth sensor, an event-based vision sensor, a proximity sensor, and an acceleration sensor.

3. The apparatus of claim 2, wherein the second UI mode is further configured to perform a command mapped based on an input pattern of the gesture provided by the user.

4. The apparatus of claim 1, wherein, based on the receiving the user command to switch to the second UI mode, the switch is further configured to change at least one from among a size, a position, and an arrangement, of at least one icon which was provided in the first UI mode.

5. The apparatus of claim 1, wherein the user command comprises at least one from among a gesture input of a pre-designated pattern, a pre-designated voice input, and a pre-designated command which is input through a wireless device.

6. The apparatus of claim 1, wherein the switch is further configured to provide a visual feedback to the user when the first UI mode is switched to the second UI mode.

7. An apparatus for providing a user interface (UI), the apparatus comprising:
a sensor configured to sense a gesture of a user, and
a processor comprising:
a provider configured to provide a first UI mode configured to receive a user input as at least one from among a mouse input received through a mouse and a touch input received through a touch screen; and
a switch configured to switch from the first UI mode to a second UI mode based on a first application being executed, wherein the first application has been registered in association with the second UI mode configured to receive the user input as the gesture of the user sensed by the sensor through a spatial distance,
wherein the switch is further configured to reset a first recognition pattern of the first UI mode to a second recognition pattern of the second UI mode, the second recognition pattern configured to distinguish a smaller number of user input types recognizable through the gesture in the second UI mode, than a number of the user input types distinguishable through the at least one from among the mouse input and the touch input in the first UI mode, and
wherein a type of the user input receivable in the first UI mode and a type of the user input receivable in the second UI mode are mutually exclusive.

8. The apparatus of claim 7, wherein the sensor comprises at least one from among an image sensor, a depth sensor, an event-based vision sensor, a proximity sensor, and an acceleration sensor.

9. The apparatus of claim 7, wherein, based on the switching from the first UI mode to the second UI mode, the switch is further configured to change at least one from among a size, a position, and an arrangement of a menu, of the first application that were provided in the first UI mode.

10. The apparatus of claim 7, wherein the first application comprises at least one from among a media player application, an image preview application, an image viewer application, a presentation application, a camera application, and a broadcast application.

11. The apparatus of claim 7, wherein the switch is further configured to switch from the second UI to the first UI mode based on a second application not supporting the second UI mode, the second application being executed in a foreground.

12. An apparatus for providing a user interface (UI), the apparatus comprising:
a sensor configured to sense a gesture of a user, and
a processor comprising:
a provider configured to provide a first UI mode configured to receive a user input as at least from among a mouse input received through a mouse and a touch input received through a touch screen based on the user being at a first distance less than a threshold distance from the apparatus; and
a switch configured to, based on the user being at a second distance greater than or equal to the threshold distance from the apparatus, switch from the first UI mode to a second UI mode configured to receive the user input as the gesture of the user sensed by the sensor through a space created by the second distance,
wherein the switch is further configured to reset a first recognition pattern of the first UI mode to a second recognition pattern of the second UI mode, the second recognition pattern configured to distinguish a smaller number of user input types recognizable through the gesture in the second UI mode, than a number of the user input types distinguishable through the at least one from among the mouse input and the touch input in the first UI mode, and wherein a type of the user input receivable in the first UI mode and a type of the user input receivable in the second UI mode are mutually exclusive.

13. The apparatus of claim 12, wherein the sensor comprises at least one from among an image sensor, a depth sensor, an event-based vision sensor, a proximity sensor, and an acceleration sensor.

14. The apparatus of claim 12, wherein, based on the switching from the first UI mode to the second UI mode, the switch is further configured to change at least one from among a size, a position, and an arrangement, of at least one icon which was provided in the first UI mode.

15. The apparatus of claim 12, wherein the switch is further configured to provide a visual feedback to the user when the first UI mode is switched to the second UI mode.

16. The apparatus of claim 12, wherein the switch is further configured to calculate the distance between the apparatus and the user, and switch from the second UI mode to the first UI mode based on the calculated distance being less than the threshold distance.

17. A method of providing a user interface (UI), the method comprising:

providing a first UI mode configured to receive a user input as at least one from among a mouse input received through a mouse and a touch input received through a touch screen; and switching an operation of the touch screen from the first UI mode to a second UI mode based on receiving a user command to switch to the second UI mode configured to receive the user input as a gesture of a user sensed by a sensor through a spatial distance, wherein the switching further comprises:

resetting a first recognition pattern of the first UI mode to a second recognition pattern of the second UI mode, the second recognition pattern configured to distinguish a smaller number of user input types recognizable through the gesture in the second UI mode, than a number of the user input types distinguishable through the at least one from among the mouse input and the touch input in the first UI mode, and while the touch screen is in the second UI mode, switching from the second UI mode to the first UI mode based on an input supported by the first UI mode received in the second UI mode, wherein a type of the user input receivable in the first UI mode and a type of the user input receivable in the second UI mode are mutually exclusive.

18. The method of claim 17, wherein the sensor comprises at least one from among an image sensor, a depth sensor, an event-based vision sensor, a proximity sensor, and an acceleration sensor.

19. The method of claim 17, wherein the switching further comprises changing at least one from among a size, a position, and an arrangement, of at least one icon which was provided in the first UI mode.

20. The method of claim 17, wherein the user command comprises at least one from among a gesture input of a pre-designated pattern, a pre-designated voice input, and a pre-designated command which is input through a wireless device.

* * * * *